United States Patent

[11] 3,561,784

| [72] | Inventor | Manfred Bantle |
| | | Esslingen-Hegensberg, Germany |
| [21] | Appl. No. | 710,812 |
| [22] | Filed | Mar. 6, 1968 |
| [45] | Patented | Feb. 9, 1971 |
| [73] | Assignee | Daimler-Benz Aktiengesellschaft |
| | | Stuttgart-Unterturkheim, Germany |
| [32] | Priority | Mar. 7, 1967 |
| [33] | | Germany |
| [31] | | D 52453 |

[54] TRANSMISSION FOR TRANSMITTING A MOVEMENT
14 Claims, 5 Drawing Figs.

[52] U.S. Cl............................................. 280/91, 74/480
[51] Int. Cl............................................. B62d 7/00
[50] Field of Search........................................ 280/91; 180/45; 74/480, 522, 559

[56] References Cited
UNITED STATES PATENTS
1,308,504  7/1919  Morrick et al................  280/91

| 3,075,784 | 1/1963 | Beyerstedt.................. | 280/91 |
| 3,197,229 | 7/1965 | Houlton...................... | 280/91 |
| 3,235,283 | 2/1966 | DeVoghel.................... | 280/91 |
| 3,305,041 | 2/1967 | Schramm..................... | 280/91 |
| 3,414,286 | 12/1968 | Muller et al................. | 280/91 |
| 3,424,023 | 1/1969 | Mustered et al............. | 280/91 |
| 1,609,527 | 12/1926 | Moorhouse................... | 74/559 |
| 2,790,522 | 4/1957 | Senkowski et al........... | 74/480 |

Primary Examiner—Kenneth H. Betts
Attorney—Craig, Antonelli, Stewart & Hill

ABSTRACT: A transmission system for the transmission of movement from one movement system to another movement system with a device for controlling and possibly effectively disconnecting the transmission of movement, in particular for crank gears and the steering system of several pairs of wheels in motor vehicles, in which a linkage is provided between a lever arm of one movement system and between a lever arm of the other movement system; the linkage includes an intermediate lever system having adjustable lever arm lengths at least for the partial linkage connected with the lever arm of one movement system, but preferably providing adjustable lever arm lengths for both partial linkages.

INVENTOR
MANFRED BANTLE

INVENTOR
MANFRED BANTLE

TRANSMISSION FOR TRANSMITTING A MOVEMENT

BACKGROUND OF THE INVENTION

The present invention relates to a transmission for transmitting a movement from one movement system to another movement system with an installation for the regulation and possible disconnection of the movement transmission. Such types of transmissions are needed frequently, for example, as crank gears or crank drives in order to selectively actuate from a common operating place several installations connected in parallel or in series either in unison and uniformly or with a controllable transmission ratio and/or to eliminate completely a part thereof when the actuation thereof is desired only to a reduced extent or not at all.

In particular, the present invention relates to a steering system for motor vehicles in order to steer several pairs of wheels of motor vehicles in dependence from one another, especially to provide either a steering of the wheels of only one wheel axle or to provide a multiaxle or all-wheel steering.

SUMMARY OF THE INVENTION

It is the aim of the present invention to obtain either a disconnectable or controllable movement transmission, suitable for this purpose, by means which are as simple as possible. Accordingly, the present invention essentially consists in that between a lever arm of one movement system and the lever arm of the other movement system a linkage is provided which includes an intermediate lever system inserted into the linkage and having controllable lever arm lengths for at least the partial linkage connected with the lever arm of one movement system. Preferably, both lever arms of the intermediate lever system are regulatable.

An essential advantage of the transmission according to the present invention resides above all in that with the adjustment of one of the two lever arms to a value of zero, the movement system coordinated to this lever arm is effectively disengaged and turned off from the participation in the movement, but nevertheless remains in an accurately predetermined position in relation to the other movement system so that upon reengagement of the disengaged movement system by the reestablishment of a suitable lever arm, the kinematics between the two systems are reestablished in the original condition. If, for example, one steering system of a vehicle is adjusted to a curve drive and if, during the curve drive, the other steering system, disengaged up to then, is engaged additionally by corresponding reestablishment of a suitably large lever arm, then the other lever system also adjusts itself simultaneously to the same curve drive.

In a preferred embodiment of the present invention, the lever arm lengths are adjustable in a stepless manner, in particular between zero and a maximum. If, for example, the lever arm length of a secondarily actuated steering system is equal to zero, then upon actuation of the steering operating element, the wheels, for example, rear wheels of the vehicle, connected to this steering system, remain in the straight driving condition, whereas, the primarily steered front wheels connected with the rear wheels by the intermediate lever system are brought simultaneously into the steering position for a curve drive.

In one advantageous construction of the present invention, the controllable intermediate lever system comprises two levers, of which at least one, but preferably both lever consist of two guide members pivotally connected with each other, of which one is pivotal at its free end about a relatively fixed axis of rotation and of which the other is connected by way of a partial linkage with the lever arm of the associated movement system by means of a joint whose distance from the relatively fixed axis of rotation is adjustable by changing the angle between the two guide members.

Possibly, especially with an adjustable length of both lever arms of the intermediate lever system, a disengageable clutch may be interposed between two lever arms. It is possible thereby to completely separate from each other the two movement systems in a simple manner.

The present invention has particular significance above all for such vehicles which can be driven selectively toward the one or the other direction and in which both the wheels of one axle as well as the wheels of the other axle can be steered primarily by a steering gear having a steering spindle or the like.

Accordingly, it is an object of the present invention to provide a movement transmission system of the type described above which is simple in construction, effective in operation, and eliminates the aforementioned shortcomings and drawbacks encountered in the prior art.

Another object of the present invention resides in a transmission system for transmitting movements between steerable wheels of a vehicle which is not only simple in construction but offers versatility in operation.

A further object of the present invention resides in a transmission system for the transmission of movements between two systems which enables an effective disengagement of one movement system from the other.

A still further object of the present invention resides in a transmission system for transmitting the movements of one movement system to another in which the transmission ratios can be readily adjusted and which is so constructed that the disengaged movement system will be automatically returned to the corresponding position upon reestablishment of the effective connection.

These and further objects, features, and advantages of the present invention will become more obvious from the following description when taken in connection with the accompanying drawing which shows, for purposes of illustration only, several embodiments in accordance with the present invention, and wherein.

Figure 1:
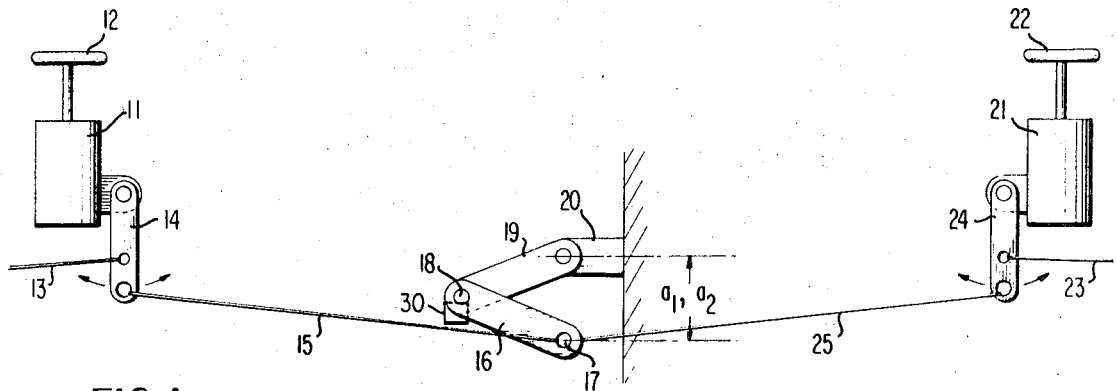
FIG. 1 is a schematic side view of an all-wheel steering system with a transmission according to the present invention.
Figure 2:
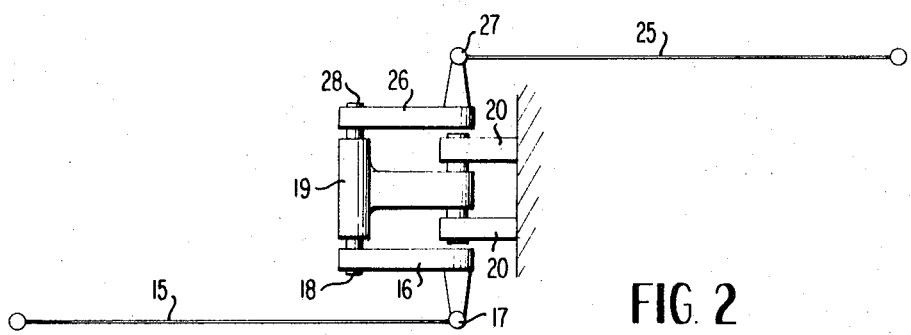
FIG. 2 is a partial plan view on a transmission of FIG. 1.

Referring now to the drawing wherein like reference numerals are used throughout the various views to designate like parts, and more particularly to FIGS. 1 and 2, reference numerals 11 and 21 designate therein the steering gears, actuated by a respective steering handwheel 12 and 22, of two steering linkages 13 and 23, respectively, for the wheels of two axles arranged at opposite ends of the vehicle. Steering links or rods 15 and 25 are connected with the steering levers 14 and 24 whose other ends are pivotally connected with the guide members 16 and 26 by means of joints 17 and 27, respectively. The ends of the guide links 16 and 26, opposite the joints 17 and 27, are further connected in FIGS. 1 and 2 by means of joints 18 and 28 with a common guide member 19 which is supported in a bearing joint or in a pair of bearing joints 20 at a part connected with the vehicle.

The angles between the guide members or links 16 and 19 and between the guide members or links 26 and 19 and therewith the lever arms $a_1$ and $a_2$ between the joints 17 and 20 and between the joints 27 and 20 can be changed by a transmission of conventional construction and not illustrated in detail herein, for example, of hydraulic type which may be provided with a conventional adjusting mechanism arranged, for example, in the guide member 19.

If, for example, $a_1 = a_2$, then upon actuation of one of the two steering gears 11 or 21 the steering links 13 and 23 of the two steering systems are actuated in an identical manner.

If, in contrast thereto, for example, the lever arm $a_2$ of the two lever arms is adjusted to zero, then upon actuation of the steering gear 11 only the steering linkage 13 is adjusted whereas the steering linkage 23 remains at rest because with a lever arm $a_2 = 0$ the joint axes of the joints 20 and 27 coincide. The steering system of the steering gear 21 is thereby locked in itself. A reverse actuation takes place if the lever arm $a_1$ is reduced to zero and the steering gear 21 together with the steering lever 24 is actuated.

Figure 4:
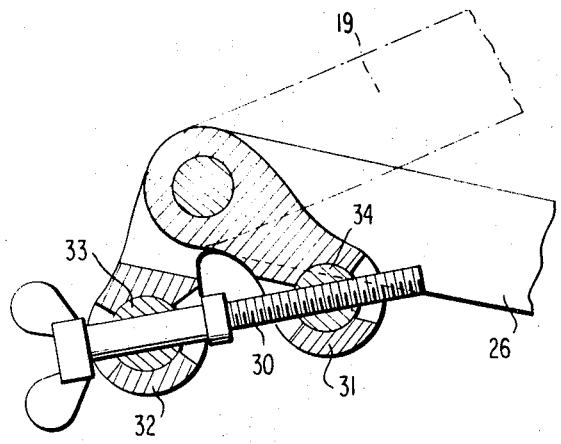
FIG. 4 is a partial side view in section of the means for varying the angle between the guide members.
Figure 5:
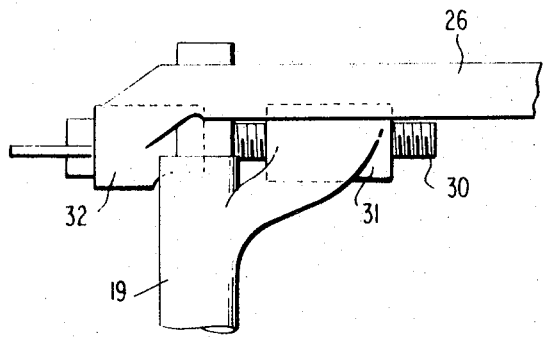
FIG. 5 is a partial plan view of the angle varying means of FIG. 4.

FIGS. 4 and 5 illustrate one means for varying the angles between the guide members 19 and 26. For example, a spindle 30, which can be adjusted directly by hand or by an auxiliary force, is provided. The spindle 30 extends through bosses 31, 32 on the two guide members. As shown in FIG. 4, spindle 30 is supported in boss 32 of the guide member 26 against axial displacement in a rotatable pin 33. On the other hand, spindle 30 is supported in axially displaceable engagement with pin 34 rotatably disposed in boss 31 of guide member 19. It is also possible, however, to effect the adjustment in other conventional manners such as, for example, hydraulic means.

By different adjustments of the lever arms $a_1$ and $a_2$, any desired transmission ratio may be established between the one movement system and the other movement system. Thus, it is possible, for example, when driving the vehicle in one direction, for example, toward the left, to adjust the steering system, in that case the rear steering system for the rear wheels to a smaller steering deflection than the front wheels.

Possibly, the transmission may also be adjustable beyond the zero position so that with opposite adjustment of the lever arms $a_1$ and $a_2$, i.e., with an adjustment of one of the lever arms to a minus value, a movement reversal occurs in the transmission from the one to the other movement system.

Appropriately, the steering rods 15 and 25 are dimensioned as long as possible in order that the steering systems are not influenced in their starting position with changes of the lever arms $a_1$ and $a_2$.

If, furthermore, for example, with a zero adjustment of the lever arm $a_2$, the steering linkage 13 is adjusted to curve drive and still during the curve drive, the lever arm $a_2$ is again adjusted to a finite value, then the steering linkage 23 assumes thereby automatically an accurately predetermined steering position corresponding to the transmission ratio of the lever arms $a_1/a_2$.

Figure 3:
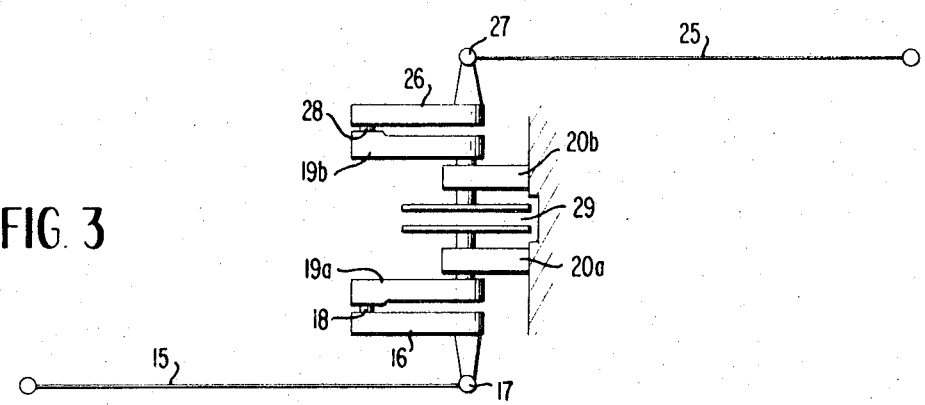
FIG. 3 is a partial plan view, similar to FIG. 2, on a modified embodiment of a transmission in accordance with the present invention.

The embodiment according to FIG. 3 differs from that of FIGS. 1 and 2 in that the center guide member 19 is subdivided into two individual guide members 19a and 19b, supported in two separate bearings 20a and 20b, and in that both guide members 19a and 19b are adapted to be coupled to one another by means of a clutch 29 of conventional construction. It is possible thereby to selectively disengage from one another or connect with one another the two steering systems. Upon disengagement of both systems, each can be actuated by itself.

In contradistinction to the embodiment according to FIGS. 1 and 2, the construction according to FIG. 3, upon reengagement of the previously disengaged system, requires a relative readjustment of the two systems in the clutch 29. This can also be realized, for example, automatically in that detents or abutments are provided in the clutch 29 which effect that upon adjustment of one system into one end position, the other system is retained in its movements for such length of time until both clutch halves again engage into one another in the end position or are able to be connected with each other in any other suitable manner.

The adjustment of the lever arms $a_1$ and $a_2$ by changes in the angle of the two associated guide members 16, 19 and 26, 19 may be realized, if so desired, by remote control, for example, from the driver seat, and more particularly may be realized mechanically, hydraulically, pneumatically, electrically, or in any other suitable known manner, utilizing also any of the aforementioned systems in a combined manner or at the guide members themselves, for example, also with a vehicle at standstill—essentially manually—in that these guide members are adjusted correspondingly in their joints 18 and 28 with respect to each other. For the purpose of adjustment of the guide members with respect to each other, for example, threaded spindles or hydraulic or pneumatic telescopic linkages may also be used which are arranged between the two mutually coordinated guide members and which decrease or increase the angle between the two guide members by corresponding threaded movement or displacement. The spindles or pistons and cylinders connecting the two guide members may be connected thereby with the two guide members by joints so as to provide pivotal connections.

While I have shown and described only two embodiments in accordance with the present invention, it is understood that the same is not limited thereto but is susceptible of numerous changes and modifications as known to a person skilled in the art. For example, the present invention is suitable for the transmission of to-and-fro movements as also for the transmission of rotating movements. Thus, it is obvious that the present invention is not limited to the details shown and described herein, and I therefore do not wish to be limited to the same, but intend to cover all such changes and modifications as are encompassed by the scope of the appended claims.

I claim:

1. A transmission for transmitting movements of one movement system to another movement system with means for the control and possibly for the effective disengagement of the movement transmission, especially for crank gears and the steering system of several pairs of wheels in motor vehicles, lever arm means for one movement system and lever arm means for the other movement system, linkage means operatively connected between said lever arm means including intermediate lever means having adjustable lever arm lengths, the intermediate lever means having adjustable lever arm lengths at least for the partial linkage connected with the lever arm means of one of the two movement systems, both lever arm means of the intermediate lever means being adjustable and the lever arm lengths being adjustable in a stepless manner between zero and a maximum value, the intermediate lever means including two levers, both of which consist of two pivotally connected guide members, one of said guide members being pivotal at its free end about a relatively fixed axis of rotation and the other guide member being operatively connected by means of a partial linkage with the lever arm means of the associated movement system by way of a joint means whose distance from the relatively fixed axis of rotation is adjustable by changing the angle between the two guide members, each of the guide members of the intermediate lever means connected with a respective partial linkage is operatively connected with a separate pivotal guide member rotatable about the relatively fixed axis of rotation, wherein the axis of rotation of the two last-mentioned guide members coincide, further comprising a disengageable clutch means between the two last-mentioned lever arms.

2. A transmission for the steering systems of several pairs of vehicle wheels as movement systems according to claim 1, wherein the steering lever of a front and of a rear steering gear are provided as lever arm means of the movement systems.

3. A transmission for transmitting movements of one movement system to another movement system with means for the control and possibly for the effective disengagement of the movement transmission, especially for crank gears and the steering system of several pairs of wheels in motor vehicles, wherein the improvement comprises lever arm means for one movement system and lever arm means for the other movement system, linkage means operatively connected between said lever arm means including intermediate lever means having adjustable lever arm lengths, wherein the intermediate lever means includes two levers, of which at least one consists of two pivotally connected guide members, one of said guide members being pivotal at its free end about a relatively fixed axis of rotation and the other guide member being operatively connected by means of a steering link with the lever arm means of the associated movement system by way of a joint means whose distance from the relative fixed axis of rotation is adjustable by changing the angle between the two guide members.

4. A transmission system according to claim 3, wherein both levers of the intermediate lever means consist of two pivotally connected guide members.

5. A transmission system according to claim 3, wherein both guide members of the intermediate lever means connected with the respective partial linkage are operatively connected with a common guide member pivotal about the relatively fixed axis of rotation.

6. A transmission according to claim 3, wherein each of the guide members of the intermediate lever means connected with a respective partial linkage is operatively connected with a separate pivotal guide member rotatable about the relatively fixed axis of rotation, and wherein the axes of rotation of the two last-mentioned guide members coincide.

7. A transmission especially with the adjustment of the lengths of the two lever arms of the intermediate lever means according to claim 6, further comprising a disengageable clutch means between the two last-mentioned lever arms.

8. A transmission for transmitting movements of one movement system to another movement system, comprising: first actuating means for actuating a first movement system, second actuating means for actuating a second movement system, linkage means operatively connected between the first and second actuating means, the linkage means including at least one common guide member pivotal about a relatively fixed axis of rotation, a first guide rod operatively connected with the first actuating means, means for hingedly connecting the first guide rod with the first actuating means on one end of the first guide rod, means for operatively connecting the first guide rod to the at least one common guide member, a second guide rod operatively connected with the second actuating means, means for hingedly connecting the second guide rod with the second actuating means on one end of the second guide rod, means for operatively connecting the second guide rod to the at least one common guide member, means for the angular adjustment of at least one of the guide rods with respect to the at least one common guide member so as to adjustably fix at least one guide rod in a preselected angular position, wherein the spacing of at least one of the hinged connecting means from the relatively fixed axis of rotation is adjustable radially to the movement of the respective actuating means about the relatively fixed axis of rotation.

9. A transmission according to claim 8, wherein the movement systems consist of steering systems for obtaining relatively variable steering deflections of the two steering systems.

10. A transmission according to claim 8, wherein the hinged connecting means between the first and second guide rods and the at least one common guide member are each provided with means for the angular adjustment of the guide rods.

11. A transmission according to claim 8, wherein the variable spacing is adjustable in a stepless manner.

12. A transmission according to claim 11, wherein the variable spacing is adjustable between zero and a maximum value.

13. A transmission according to claim 8, wherein both guide rods consist of two pivotally connected guide members.

14. A transmission according to claim 8, further comprising a disengageable clutch means located between the first and second guide rods.